Figure 1:
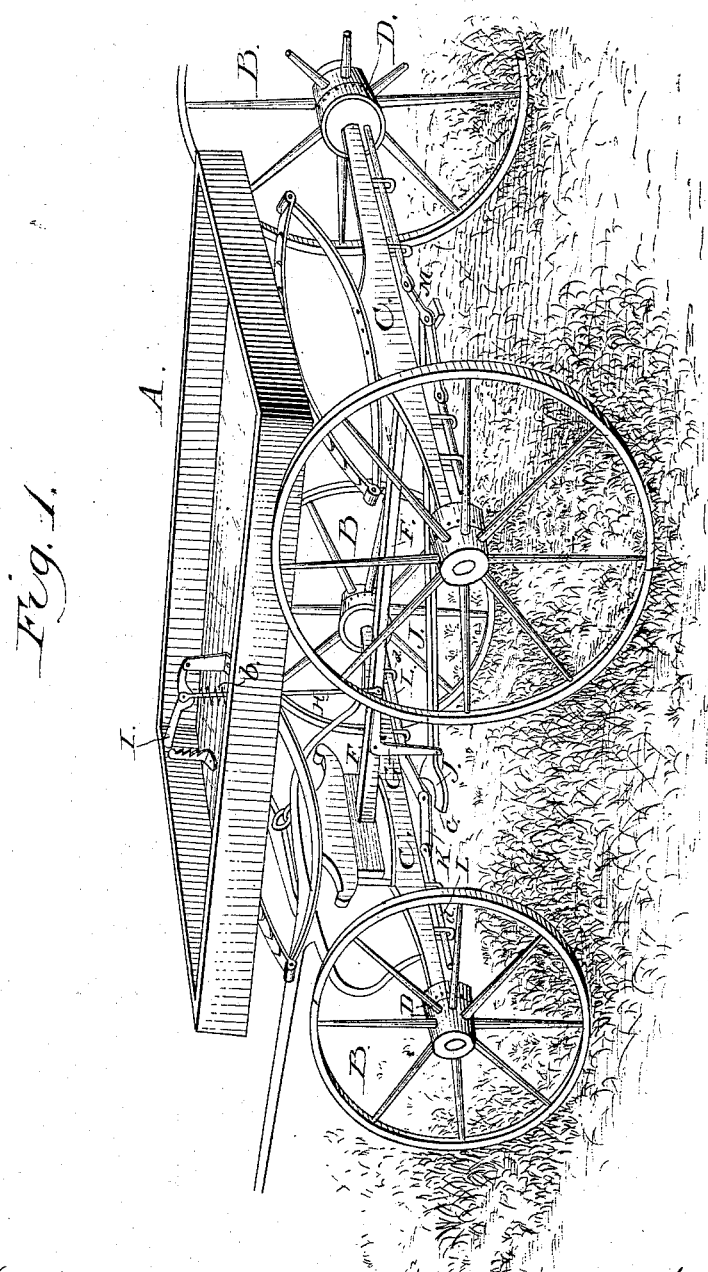

(No Model.)
2 Sheets—Sheet 1.

M. M. NATHANSON.
VEHICLE BRAKE.

No. 263,057.

Patented Aug. 22, 1882.

Witnesses
Walter Fowler.
H. B. Applewhaite.

Inventor;
Martin M. Nathanson
by Dewey & Co
A. N. Evans & Co
his Attys.

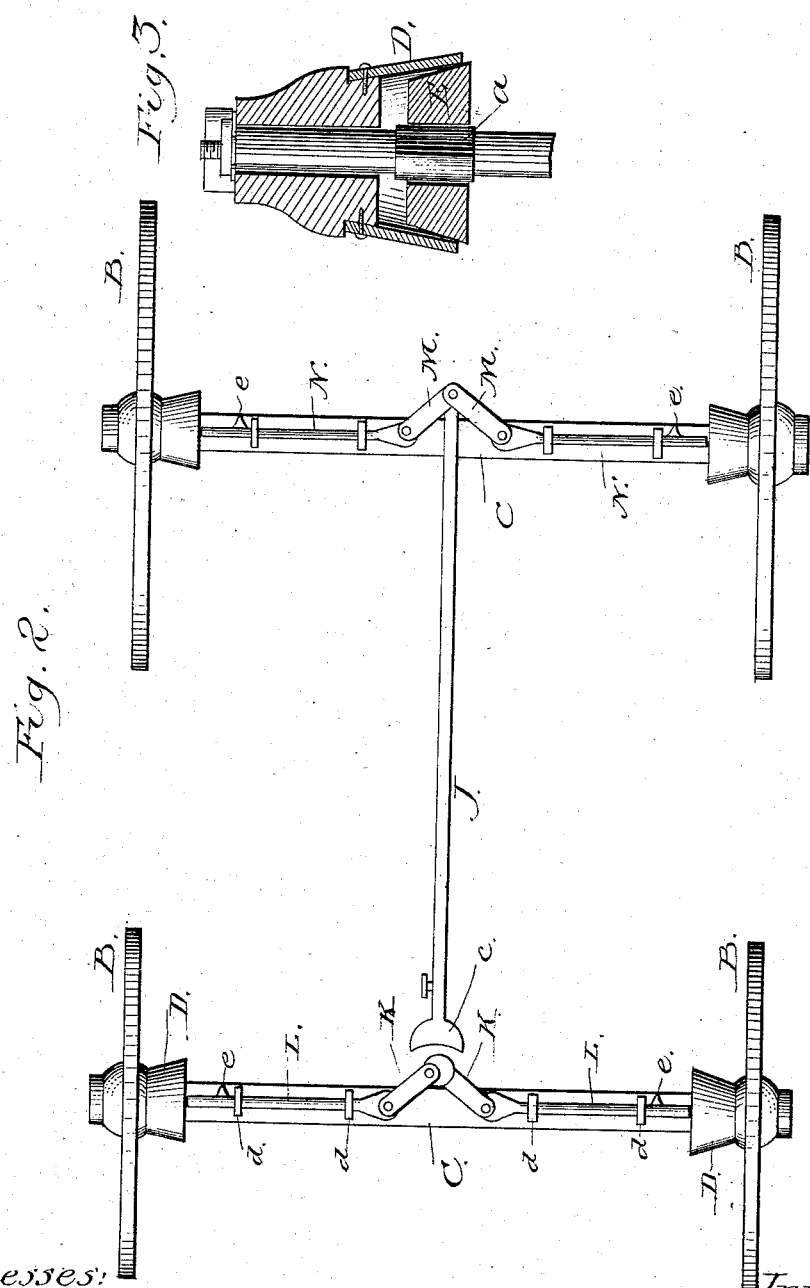

UNITED STATES PATENT OFFICE.

MARTIN M. NATHANSON, OF SAN FRANCISCO, CALIFORNIA.

VEHICLE-BRAKE.

SPECIFICATION forming part of Letters Patent No. 263,057, dated August 22, 1882.

Application filed January 23, 1882. (No model.)

*To all whom it may concern:*

Be it known that I, MARTIN M. NATHANSON, of the city and county of San Francisco, State of California, have invented a Vehicle-Brake; and I hereby declare the following to be a full, clear, and exact description thereof.

My invention relates to a brake for vehicles; and it consists in forcing conical pieces into hollow conical attachments on the hubs of the wheels by means of an operating-rod pressing upon and forcing toggle-levers, the whole being operated by a bell-crank lever and a rod within the body of the vehicle, all of which will hereinafter more particularly appear, reference being made to the accompanying drawings, in which—

Figure 1 is a perspective view of a wagon having my brake attached. Fig. 2 is a bottom plan view of the axles and brake, showing the mode of application. Fig. 3 is a vertical sectional view through the hub and brake-block.

Let A represent the body of the vehicle, B the wheels, and C the axles.

The wheels B have the inner ends of their hubs formed into or have attached firmly thereto a conical piece, D, hollowed out, as shown, and having its larger end toward the inside.

The axles C are formed just within their round ends into a square portion, (marked $a$,) over which is fitted a conical section, E, so that, while adapted to slide out and back, it cannot turn on the axle. The piece E has its smallest portion toward the outside, and fits loosely within the hollow conical hub D of the wheels, thus forming a bearing for said hubs. The same device is upon all the wheels, as shown.

F represents the reach or brace between the running-gear. Pivoted to the forward end of this reach, on one side, is a bell-crank lever, G, one end of which is pivoted to a rod, H, which extends up through the bottom of the vehicle, and is pivoted to a foot-lever, I. A spring, $b$, holds the rod and lever up. The other end of the bell-crank lever G is pivoted to a horizontal bar, J, which extends rearwardly longitudinally past the rear axle. The forward end of this rod J is provided with a head, $c$, for better convenience in impinging upon and operating the toggle-lever K, the ends of which are pivoted to rods L L on each side, lying under the forward axle and supported in guides $d\ d$. The ends of these rods L L extend toward and touch the lower parts of the conical sections E. The rear end of the rod J is pivoted to a toggle-lever, M, the ends of which are pivoted to the rods N N, similar to rods L L, and similarly supported under the rear axle as the said rods are in front. Small stops $e$ are placed upon the rods L L and N N outside of the guides to prevent too much play.

The operation of this device is as follows: By pressing upon the foot-lever I the rod H is pressed down. This presses down one arm of the bell-crank lever G and pushes forward the other arm, which forces the rod J forward. Its head presses upon the toggle-lever K, which forces the rods L L outwardly against the conical sections E and forces them into the hollow hubs D, and thus brakes the forward wheels. The rod J in being forced forward pulls upon the toggle-lever M, which forces the rods N N outwardly, their ends forcing the sections E within the hubs D, and thus braking the rear wheels. In this manner all the wheels have the brake applied at once, which is the object intended. When the foot is removed from the lever I the spring $b$ causes the rods L L and N N to return. The conical sections E, being relieved, no longer bind upon the wheels, which turn freely upon them.

When the brake is applied with some power to all the wheels of a vehicle it would be difficult to turn a corner without wrenching a wheel or breaking the pole or shafts. To provide for this I place in the knee or joint of the toggle-lever K a horizontal roller, U, journaled upon the pivot of said lever. It is upon this roller that the head $c$ of the rod J impinges when operating the toggle-lever. It thus forms a bearing or track which will allow the forward axle to be turned away from the rod J, and after being free from it the forward wheels are relieved from the brake, and the vehicle can be turned.

If necessary, I could hold the conical sections E back upon the axles by means of springs.

It will be seen that the operation of this brake is by friction—a necessary principle of all braking devices.

Wheels when revolving rapidly must not be checked too suddenly. If they are, some part will be broken, or the wheels will slide with the momentum of the vehicle.

I am aware that locking devices have been tried in which bolts are adapted to be shot out into holes in the hubs of the wheels, thus locking them; but my invention is not to lock the wheels, but to bind them by friction.

Having thus described my invention, what I claim as new, and desire to secure by Letters Patent of the United States, is—

1. In a vehicle, the device for braking all the wheels, consisting of the hollow conical hubs D upon the wheels, conical sections E, and the means for forcing said sections into the hollow conical hubs, consisting of the rods L L and N N, toggle-levers K and M, rod J, bell-crank lever G, rod H, spring $b$, and foot-lever I, when arranged and operated substantially as herein set forth.

2. In a vehicle having a device for braking all the wheels of a vehicle at once, as herein shown, the arrangement and combination of the forward axle with the knee or toggle lever K, roller U, and rod J, with its head $c$, substantially as and for the purpose herein described.

In witness whereof I have hereunto set my hand.

MARTIN M. NATHANSON.

Witnesses:
M. G. KENNEDY,
J. H. BLOOD.